United States Patent
Blacha et al.

(10) Patent No.: US 12,330,802 B2
(45) Date of Patent: Jun. 17, 2025

(54) ROTORCRAFT WITH AN ENERGY SOURCE STORAGE UNIT

(71) Applicant: AIRBUS HELICOPTERS DEUTSCHLAND GMBH, Donauworth (DE)

(72) Inventors: Martin Blacha, Donauworth (DE); Sascha Schneider, Meitingen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 72 days.

(21) Appl. No.: 18/135,361

(22) Filed: Apr. 17, 2023

(65) Prior Publication Data

US 2024/0092188 A1    Mar. 21, 2024

(30) Foreign Application Priority Data

Jul. 19, 2022 (EP) .................... 22400006

(51) Int. Cl.
 B64D 37/04 (2006.01)
 B60L 50/60 (2019.01)
 (Continued)

(52) U.S. Cl.
 CPC .............. B64D 37/04 (2013.01); B60L 50/60 (2019.02); B64C 1/062 (2013.01); B64C 27/06 (2013.01)

(58) Field of Classification Search
 CPC ....... B64C 1/062; B64C 25/08; B64D 27/355; B64D 37/04; B64D 37/12
 See application file for complete search history.

(56) References Cited

U.S. PATENT DOCUMENTS 2,383,532 A * 8/1945 Coxon ................... B64D 37/12
244/135 R
3,966,147 A * 6/1976 Wittko ................... B64D 37/04
248/311.2

(Continued)

FOREIGN PATENT DOCUMENTS

CN     113415407 A   9/2021
DE  102020000216 A1   7/2020

(Continued)

OTHER PUBLICATIONS

European Search Report for European Application No. EP 22400006.7, Completed by the European Patent Office, Dated Dec. 16, 2022, 10 pages.

*Primary Examiner* — Michael H Wang
(74) *Attorney, Agent, or Firm* — BROOKS KUSHMAN P.C.

(57) ABSTRACT

A fuselage arranged within a fuselage outer shell; at least one main rotor located on top of the fuselage; at least one engine provided for driving the at least one main rotor; and at least one energy source storage unit comprising at least one energy source configured to provide energy for powering the at least one engine for driving the at least one main rotor; wherein the at least one energy source storage unit is arranged outside the fuselage outer shell; and wherein the fuselage and the fuselage outer shell form in vicinity of the at least one energy source storage unit a crashable structure configured to be crashable in an emergency landing at least for limiting effects of impact on the at least one energy source storage unit.

20 Claims, 5 Drawing Sheets

(51) Int. Cl.
*B64C 1/06* (2006.01)
*B64C 27/06* (2006.01)

(56) References Cited

U.S. PATENT DOCUMENTS

| | | | | |
|---|---|---|---|---|
| 4,306,693 A * | 12/1981 | Cooper | ............... | B64D 37/12 |
| | | | | 244/140 |
| 4,860,972 A * | 8/1989 | Lannerd | ............... | B64D 37/04 |
| | | | | 244/135 R |
| 5,451,015 A * | 9/1995 | Cronkhite | ............. | B64D 37/04 |
| | | | | 244/119 |
| 6,123,495 A * | 9/2000 | Callahan | ............... | B64F 5/50 |
| | | | | 254/323 |
| 8,668,167 B2 * | 3/2014 | Mark | ............... | B64D 1/16 |
| | | | | 244/135 R |
| 9,868,544 B2 * | 1/2018 | Bistuer | ............... | B64D 37/04 |
| 2009/0145998 A1 | 6/2009 | Salyer | | |
| 2010/0019088 A1 * | 1/2010 | Hoffjann | ............... | B64D 11/02 |
| | | | | 244/129.1 |
| 2014/0367525 A1 | 12/2014 | Salyer | | |
| 2015/0122940 A1 * | 5/2015 | Mairou | ................ | B64C 27/04 |
| | | | | 244/17.11 |
| 2015/0136906 A1 * | 5/2015 | Fink | ............... | B64C 1/18 |
| | | | | 244/119 |
| 2016/0229516 A1 * | 8/2016 | Behrens | ............... | B64D 37/04 |
| 2017/0313434 A1 * | 11/2017 | Peryea | ............... | B64D 37/32 |
| 2017/0369159 A1 * | 12/2017 | Fink | ............... | B64C 27/04 |
| 2018/0170509 A1 * | 6/2018 | Mores | ............... | B64C 27/04 |
| 2021/0101675 A1 | 4/2021 | Tsutsumi et al. | | |

FOREIGN PATENT DOCUMENTS

| | | |
|---|---|---|
| EP | 3263451 A1 | 1/2018 |
| EP | 3333064 A1 | 6/2018 |
| GB | 2587674 A | 4/2021 |
| WO | 2019244462 A1 | 12/2019 |
| WO | 2021064386 A2 | 4/2021 |

* cited by examiner

ROTORCRAFT WITH AN ENERGY SOURCE STORAGE UNIT

CROSS-REFERENCE TO RELATED APPLICATIONS

This application claims priority to European patent application No. EP 22400006.7 filed on Jul. 19, 2022, the disclosure of which is incorporated in its entirety by reference herein.

TECHNICAL FIELD

The disclosure is related to a rotorcraft comprising a fuselage arranged within a fuselage outer shell, at least one main rotor located on top of the fuselage, at least one engine provided for driving the at least one main rotor, and at least one energy source storage unit comprising at least one energy source configured to provide energy for powering the at least one engine for driving the at least one main rotor.

BACKGROUND

Various recent rotorcraft development programs and, more particularly, recent helicopter development programs include application of alternative engine concepts which are based on use of clean and sustainable energies and, thus, respective energy storage devices, such as batteries or hydrogen tanks. However, use of such clean and sustainable energies in helicopters requires provision of alternative energy storage device arrangements to determine suitable positions and mounting concepts for storing the respective energy storage devices on the helicopters in order to protect occupants inside the helicopters, as the respective energy storage devices behave different than well-known conventional fuel storage systems, e.g., in case of fire or crash, and with respect to cooling need or ventilation.

For instance, in case of a helicopter crash a fuel bladder with fuel in such a well-known conventional fuel storage system is deformable as a whole. More specifically, the fuel is a fluid and may easily deform within a respectively available volume inside the fuel bladder. Furthermore, the fuel bladder usually comprises a high elasticity and deformability and, thus, may react as an elastic member in case of excessive deformations during the helicopter crash.

Moreover, as the well-known conventional fuel storage system is usually installed within a respective subfloor group below cabin floor of a given helicopter, in most cases the fuel bladder would deform during helicopter crash and would not block the subfloor group's deformation behavior in order to dissipate energy for decreased acceleration levels for occupants of the helicopter inside the helicopter's cabin on top of the subfloor group. In addition, the well-known conventional fuel storage systems are not prone to take fire without ignition or fuel getting very hot during operation.

In contrast thereto, batteries and hydrogen tanks are usually very rigid systems, i.e., with very rigid bodies, and have many characteristics which differ significantly from the above-described characteristics of well-known conventional fuel storage systems, which results in non-negligible problems and challenges with respect to protection of a given helicopter and its structure, e.g., in case of a crash. In fact, a rigid body generally does not deform significantly and would act as a "hard point" in the helicopter's structure, which prevents deformation and, in consequence, energy dissipation for helicopter occupants during crash.

More particularly, in case of batteries the latter are e.g., exposed as a consequence of a crash to the so-called post-crash-fire phenomenon, which means that one or more battery cells may take fire and burn with extremely high temperatures generating very toxic gases. Some types of batteries are even prone to self-ignition and may start to burn and generate toxic gases even in a non-crash scenario.

In case of hydrogen tanks, which are mostly constructed using steel or massive carbon fiber reinforced polymer liners under high pressure, similar problems may occur. In fact, they likewise form a very rigid system and prevent energy dissipation for occupants of the helicopter as such a rigid system would prevent the helicopter's subfloor group from collapsing in a controlled manner in case of helicopter crash. This endangers occupants more than in conventional helicopters with well-known conventional fuel storage systems. Moreover, hydrogen tanks may generate dangerous inflammable gases (in combination with oxygen), which may lead to explosions if a critical hydrogen-to-oxygen ratio is achieved. Therefore, hydrogen tanks must be sufficiently ventilated.

Finally, batteries and hydrogen tanks may become untight, e.g., during or after helicopter crash. In this case, extreme hot or toxic gases may be ejected, which may endanger occupants in the helicopter if a respective energy storage device is located inside the helicopter's cabin.

However, current concepts of providing helicopters and, more generally, rotorcrafts with energy storage devices, such as batteries or hydrogen tanks, to enable use of clean and sustainable energies in rotorcrafts merely suggest to fix the energy source storage devices somewhere on the rotorcrafts. For instance, the document US 2014/0367525 A1 suggests to fix respective batteries below an outer shell of a fuselage of a rotorcraft, and the document DE 10 2020 000 216 A1 suggests to fix respective batteries on top of an outer shell of a fuselage of a rotorcraft. The document CN 113 415 407 A, in turn, suggests to fix respective batteries laterally on an outer shell of a fuselage of a rotorcraft. Furthermore, the documents WO 2021/064386 A2 and GB 25 87 674 A suggest to fix respective batteries inside a fuselage of a rotorcraft. Finally, the document WO 2019/244462 A2 suggests to fix respective batteries inside a fuselage and laterally to the fuselage of a rotorcraft.

SUMMARY

It is an object of the present disclosure to provide a new rotorcraft with at least one energy source storage unit adapted to comprise one of a hydrogen storage device or a battery, the new rotorcraft being adapted to improve occupant security in case of a rotorcraft crash and being designed for an improved interchangeability, fire protection, and structural integrity of the at least one energy source storage unit.

This object is solved by a rotorcraft with at least one energy source storage unit, the rotorcraft comprising the features of claim 1. More specifically, according to preferred embodiments the rotorcraft comprises a fuselage arranged within a fuselage outer shell; at least one main rotor located on top of the fuselage; at least one engine provided for driving the at least one main rotor; and at least one energy source storage unit comprising at least one energy source configured to provide energy for powering the at least one engine for driving the at least one main rotor. The at least one energy source storage unit is arranged outside the fuselage outer shell. The fuselage and the fuselage outer shell form in vicinity of the at least one energy source storage unit a crashable structure configured to be crashable in an emergency landing at least for limiting effects of impact on the at least one energy source storage unit.

More generally, the basic idea is to attach the energy source storage unit with storage volume for batteries or hydrogen bottles outside the rotorcraft instead of an internal integration within the inner volume of the rotorcraft. Respective external energy source storage containers may be arranged in a manner close to a lower area, i.e., subfloor region, of a rotorcraft. In conventional rotorcrafts this lower area is already designed for fuel storage and, thus, strong and stiff enough in order to cope with loads and masses caused by respectively required energy source storage items, without any additional design constraint.

It is preferred to keep all energy source storage units outside the fuselage's inner volume or even completely outside the complete rotorcraft. However, in some specific cases in an area at the bottom end of a rotorcraft a dedicated cavity can be created where conventionally the fuel bladders are installed. In this case, the energy source storage units are preferably also kept outside the main structure, although the external skin which is conventionally enclosing the fuel bladders has to be modified in a manner that the outer skin simply forms a cavity where an energy source storage unit may be attached to form the external side without the need of removing covers or to open doors or panels, respectively. It is beneficial if the surrounding fuselage or airframe structure protrudes in vertical direction in order to protect the batteries or hydrogen bottles from ground contact.

Advantageously, by installing the at least one energy source storage unit outside the fuselage outer shell, a simple integration of the at least one energy source storage unit may be achieved and a clear separation between the rotorcraft's structure, i.e., cabin, engines, and systems, and the at least one energy source of the at least one energy source storage unit may be provided. Thereby, internal volume inside the fuselage may be saved for payload, systems, and/or equipment. Furthermore, by such a clear separation, an improved accessibility of the at least one energy source storage unit is obtained and an easy and quick exchange of the at least one energy source may be enabled. Moreover, the at least one energy source storage unit is preferably installed close to a respective internal framework of the rotorcraft's fuselage, which offers benefits for a strong attachment of these significant masses to the primary structure of the rotorcraft.

Furthermore, by designing the fuselage and the fuselage outer shell such that they form in vicinity of the at least one energy source storage unit a crashable structure configured to be crashable in an emergency landing at least for limiting effects of impact on the at least one energy source storage unit, a significant increase in safety is obtained. In fact, hot and/or explosive and/or toxic gases emanating from the at least one energy source storage unit e.g., in case of a rotorcraft crash may easily be kept outside the rotorcraft's cabin without provision of an additional separation item, as the rotorcraft's outer shell already acts as separation item. Thus, a significant saving of overall weight of the rotorcraft may be achieved.

Advantageously, the at least one energy source storage unit is a modular system that can be manufactured separate from the fuselage of the rotorcraft. This modular system is preferably exchangeable, at least the at least one energy source, and may preferentially be easily and quickly installed on, or removed from, the rotorcraft.

By way of example, the at least one energy source may be a swappable battery of a hydrogen bottle or tank. In both cases, the provision in the context of a modular, preferably exchangeable system enables an easy access for maintenance, swapping, inspection, and fire extinguishing process in case of fire, smoke, or exhaust of hot gases. Furthermore, if the at least one energy source is e.g., a swappable battery, a suitable battery cooling system may easily be integrated into the at least one energy source storage unit, which may e.g., be provided with external pods for storage of the at least one energy source. For instance, an air inlet at a front area or so-called lateral NACA inlets may easily be integrated in such external pods as there is by definition free airflow around wide areas of a respective battery volume. This advantageously simplifies passive battery cooling, which may in conventional storage concepts of an internal battery storage represent a certain effort in terms of weight and reliability. Similarly, fire toxic gases may easily be guided to a provided exhaust area and kept completely outside the rotorcraft.

According to a first illustrative realization, the rotorcraft's outer shell may form a cavity outside the fuselage, i.e., outside the rotorcraft's main structure. This cavity preferably provides sufficient space for the attachment of the at least one energy source storage unit. As in this case the at least one energy source storage unit needs to be protected in case of a rotorcraft crash, a respective height (or depth) of deformable surrounding structural parts of the fuselage and the outer shell forming the cavity is preferably greater than a predetermined height of the at least one energy source storage unit in order to dissipate energy in these deformable surrounding structural parts.

According to a second illustrative realization, a respective bottom lateral area of the rotorcraft may be used for the attachment of the at least one energy source storage unit. Such a lateral attachment, i.e., arrangement may be partially integrated in the fuselage's outer loft, or located completely outside the outer loft. In both cases, ingress and egress features for pilots and passengers of the rotorcraft may be integrated into the at least one energy source storage unit as part of the design, such as e.g., an integrated accessible foot-step. Furthermore, fire prove covers may also be integrated or mounted separately in order to enable a safe and secure exit from the rotorcraft in case of fire.

More generally, in both illustrative realizations crash features such as bumpers may easily by integrated into the at least one energy source storage unit, if required, and these crash features may be optimized to dedicated needs of the respectively used at least one energy source independent of underlying global rotorcraft requirements. This enables optimization of the rotorcraft's crash behavior and an improved energy absorbing principle may be chosen individually and independent of a respective fuselage construction, which may accordingly be weight-reduced.

According to some aspects, the at least one energy source storage unit may comprise at least one energy source storage container for accommodating the at least one energy source, and the at least one energy source may comprise at least one of a hydrogen storage device or an electrical energy storage device.

More particularly, the at least one energy source storage container may be removably attached to the fuselage and/or the fuselage outer shell.

According to some aspects, the at least one energy source storage unit is arranged in a subfloor region of the rotorcraft.

The fuselage and the fuselage outer shell may form a central box-like structure in the subfloor region; and the at least one energy source storage unit may be arranged laterally at the central box-like structure, at least essentially in parallel to a length direction of the fuselage.

Furthermore, the fuselage and the fuselage outer shell may form a central box-like structure with lateral extensions in the subfloor region; and the at least one energy source storage unit may be arranged laterally at the lateral extensions, at least essentially in parallel to a length direction of the fuselage.

The central box-like structure and the lateral extensions may form a subfloor outer shell forming with the fuselage outer shell an aerodynamically shaped outer skin; and the at least one energy source storage unit may be arranged outside the aerodynamically shaped outer skin.

Preferably, the central box-like structure forms the crashable structure.

Furthermore, the at least one energy source storage unit may form an accessible step.

Moreover, the fuselage and the fuselage outer shell may form lateral box-like structures in the subfloor region; and the at least one energy source storage unit may be arranged between the lateral box-like structures in the subfloor region, at least essentially in parallel to a length direction of the fuselage.

The lateral box-like structures may form the crashable structure.

According to some aspects, the at least one energy source storage unit comprises a storage extension extending from the subfloor region into an upper region of the rotorcraft.

According to some aspects, the at least one energy source storage unit comprises at least one fuel tank arranged in the subfloor region, wherein the fuel tank forms the crashable structure.

In general, the at least one energy source storage unit may be provided with at least one energy absorption means. Preferably, the at least one energy absorption means comprises at least one bumper.

Furthermore, the at least one energy source storage unit may generally comprise at least one air inlet configured to enable air cooling of the at least one energy source.

BRIEF DESCRIPTION OF THE DRAWINGS

Preferred embodiments of the disclosure are outlined by way of example in the following description with reference to the attached drawings. In these attached drawings, identical or identically functioning components and elements are labelled with identical reference numbers and characters and are, consequently, only described once in the following description.

DETAILED DESCRIPTION

Figure 1:
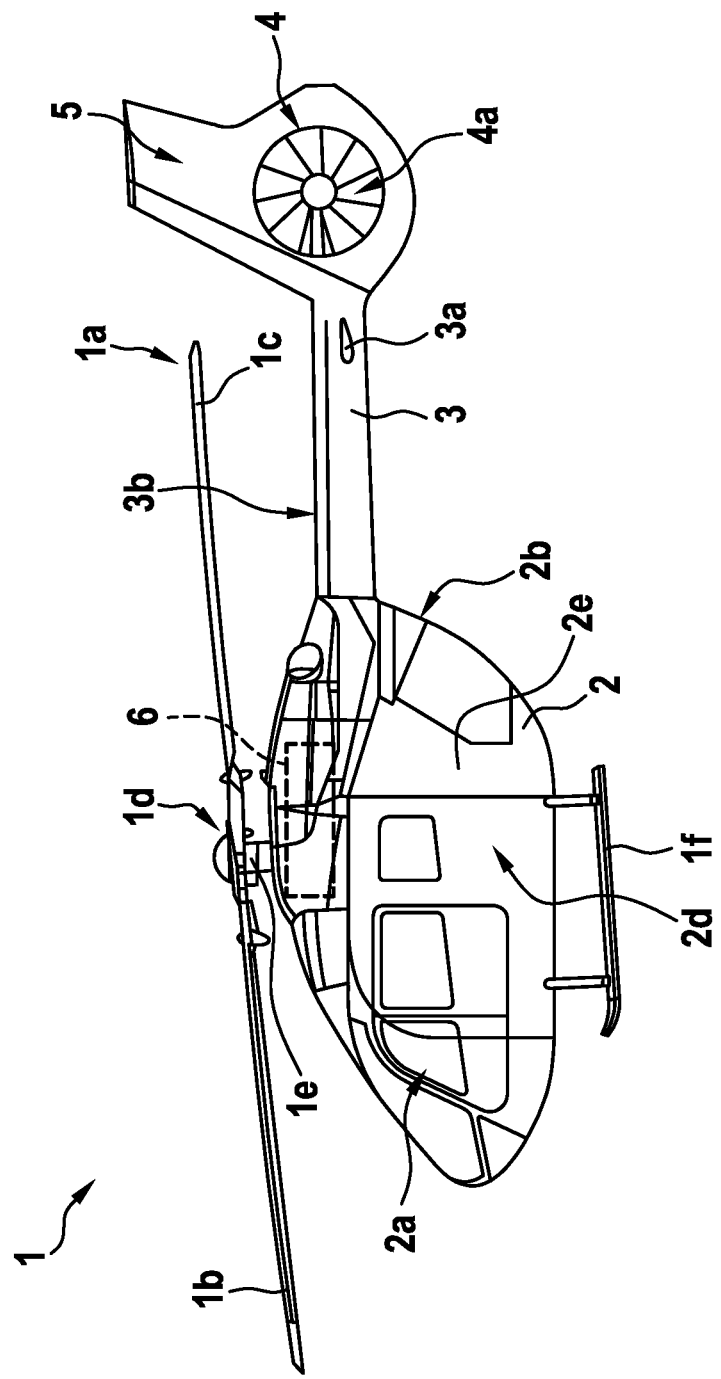
FIG. 1 shows a lateral view of a rotorcraft with a fuselage and an outer shell.

FIG. 1 shows an aircraft 1 that is exemplarily illustrated as a rotorcraft and, more particularly, as a helicopter. Thus, for purposes of simplicity and clarity, the aircraft 1 is hereinafter referred to as the "helicopter 1".

Illustratively, the helicopter 1 comprises at least one main rotor 1a for providing lift and forward or backward thrust during operation. One or more engines 6 are provided for driving the at least one main rotor 1a in operation.

By way of example, the at least one main rotor 1a is embodied as a multi-blade main rotor that comprises a plurality of rotor blades 1b, 1c which are mounted at an associated rotor head 1d to a rotor shaft 1e, which rotates in operation of the helicopter 1 around an associated rotor axis. The helicopter 1 further comprises a fuselage 2 on top of which the at least one main rotor 1a is located.

The fuselage 2 is arranged within an outer shell 2e which forms a starboard side wall and a portside wall 2d. Illustratively, the fuselage 2 is connected to a landing gear if and defines a cabin 2a and a rear fuselage 2b. The rear fuselage 2b is connected to a tail boom 3.

By way of example, the helicopter 1 further comprises at least one preferentially shrouded counter-torque device 4 configured to provide counter-torque during operation, i.e., to counter the torque created by rotation of the at least one main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5. Illustratively, the tail boom 3 is also provided with a suitable horizontal stabilizer 3a.

The tail boom 3 may be implemented as a composite tail boom, i.e., a tail boom that comprises composite material and that is preferably at least essentially manufactured from composite material. Illustratively, the composite tail boom 3 is implemented as a slim beam element and comprises at least a tubular tail boom cone 3b. Such composite tail booms are well-known to the person skilled in the art and, therefore, not described in further detail for brevity and conciseness.

Figure 2:
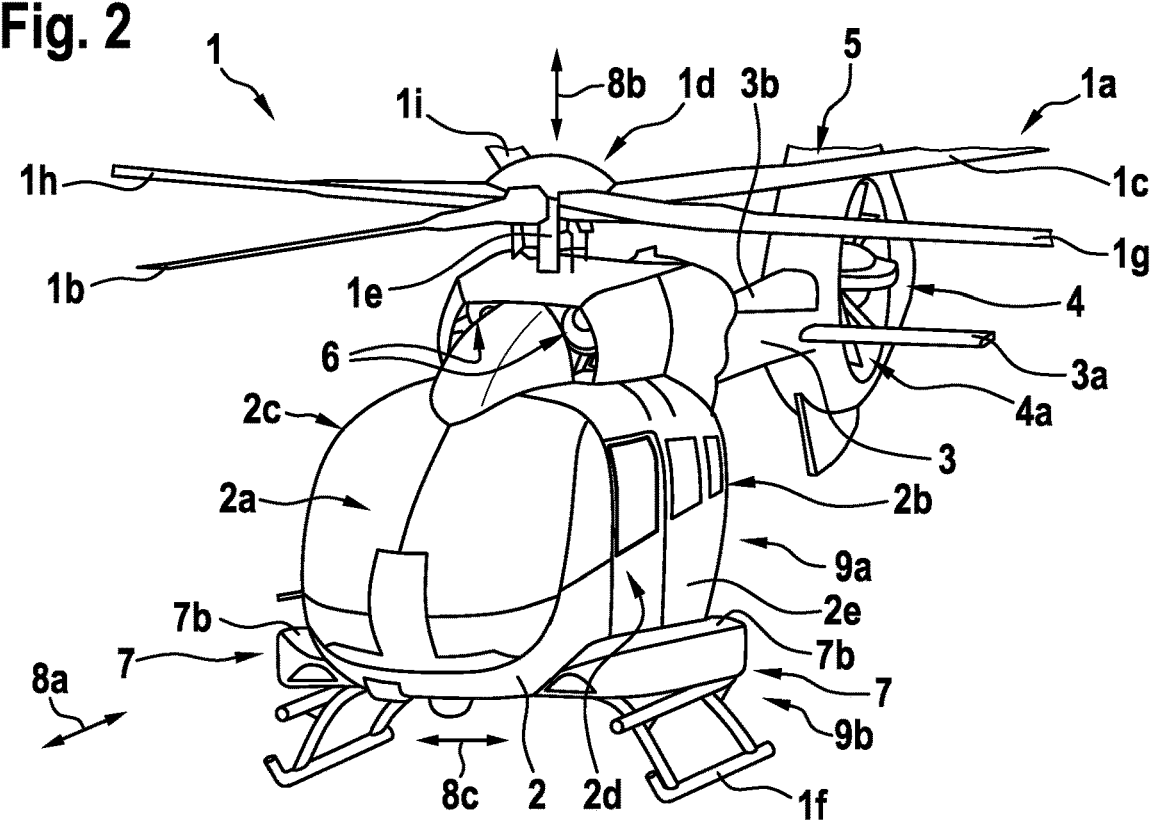
FIG. 2 shows a perspective view of the rotorcraft of FIG. 1 with illustrative energy source storage units.

FIG. 2 shows the helicopter 1 of FIG. 1. Illustratively, the helicopter 1 extends in a longitudinal or length direction 8a, which is also referred to hereinafter as the "roll-axis 8a", a vertical or height direction 8b, which is also referred to hereinafter as the "yaw-axis 8b", and a lateral or width direction 8c, which is also referred to hereinafter as the "pitch-axis 8c".

According to FIG. 1, the helicopter 1 comprises the fuselage 2 that forms the cabin 2a and that is arranged within the outer shell 2e which forms a starboard side wall 2c and the portside wall 2d. The fuselage 2 is connected to the landing gear if and the tail boom 3 which is provided with the horizontal stabilizer 3a, the at least one counter-torque device 4, and the fin 5. On top of the fuselage 2 is located the at least one main rotor 1a which is driven by the one or more engines 6. The at least one main rotor 1a is embodied as a multi-blade main rotor with the rotor blades 1b, 1c, as well as rotor blades 1g, 1h, 1i, all of which are mounted at the rotor head 1d to the rotor shaft 1e. However, for purposes of simplicity and clarity of the drawing, the rotor blades 1b, 1c, 1g, 1h, 1i are cut-off at their outer ends and, thus, only shown partly.

Illustratively, the helicopter 1 comprises at least one energy source storage unit 7 with at least one energy source configured to provide energy for powering the one or more engines 6 for driving the at least one main rotor 1a. The at least one energy source storage unit 7 is arranged outside the outer shell 2e.

By way of example, the helicopter 1 comprises two energy source storage units 7: a first energy source storage unit 7 is illustratively located at the starboard side wall 2c, and a second energy source storage unit 7 is illustratively located at the portside wall 2d. Each energy source storage unit 7 may comprise at least one energy source storage container 7b for accommodating at least one associated energy source. Each energy source storage container 7b may be attached removably to the fuselage 2 and/or the fuselage outer shell 2e.

Illustratively, the helicopter 1 includes in the height direction 8b an upper region 9a and a lower region 9b. The lower region 9b is preferably a so-called "subfloor region", as explained in more detail at FIG. 6, and is, therefore, hereinafter referred to as the "subfloor region 9b". Preferably, each energy source storage unit 7 is arranged in the subfloor region 9b.

Figure 3:
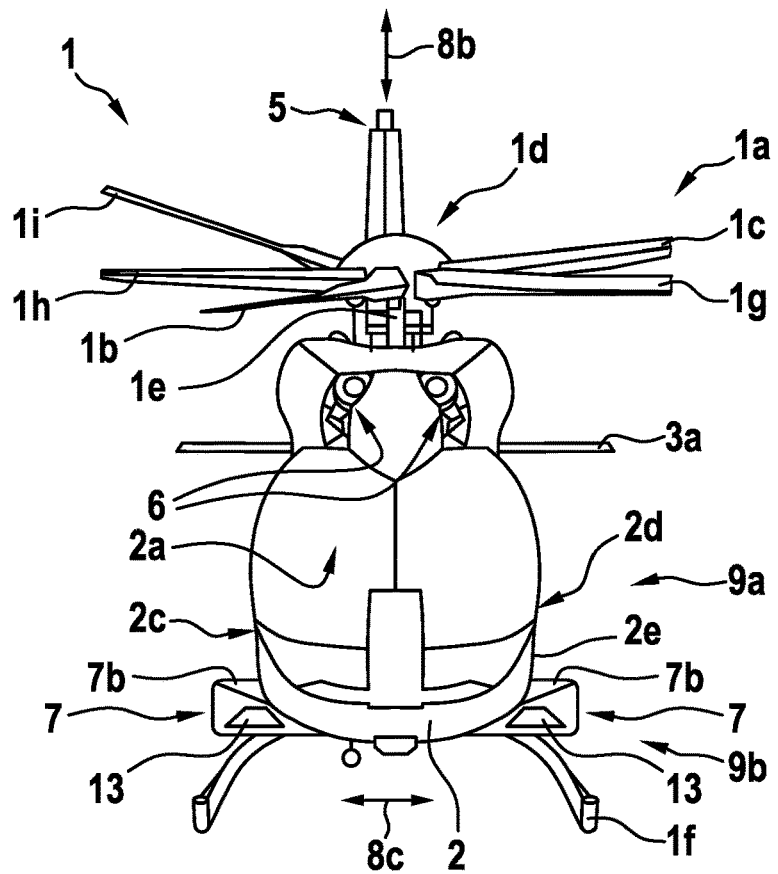
FIG. 3 shows a front view of the rotorcraft of FIG. 2.

FIG. 3 shows the helicopter 1 of FIG. 2, which comprises the fuselage 2 that forms the cabin 2a and that is arranged within the outer shell 2e which forms the starboard side wall 2c and the portside wall 2d. The fuselage 2 is connected to the landing gear if and the tail boom 3 which is provided with the horizontal stabilizer 3a, the at least one counter-torque device 4, and the fin 5. On top of the fuselage 2 is located the at least one main rotor 1a which is driven by the one or more engines 6. The at least one main rotor 1a is embodied as a multi-blade main rotor with the rotor blades 1b, 1c, 1g, 1h, 1i, which are mounted at the rotor head 1d to the rotor shaft 1e and illustratively cut-off at their outer ends. The helicopter 1 further comprises the energy source storage units 7 with their energy source storage containers 7b.

FIG. 3 further illustrates arrangement of the energy source storage units 7 outside the outer shell 2e and in the subfloor region 9b, as well as an exemplary removable attachment of the energy source storage containers 7b to the fuselage 2 and/or the fuselage outer shell 2e. Each energy source storage unit 7 may comprise at least one air inlet 13, such as e.g., a so-called NACA inlet, configured to enable air cooling of one or more energy sources accommodated in the energy source storage container 7b of the respective energy source storage unit 7.

Figure 4:
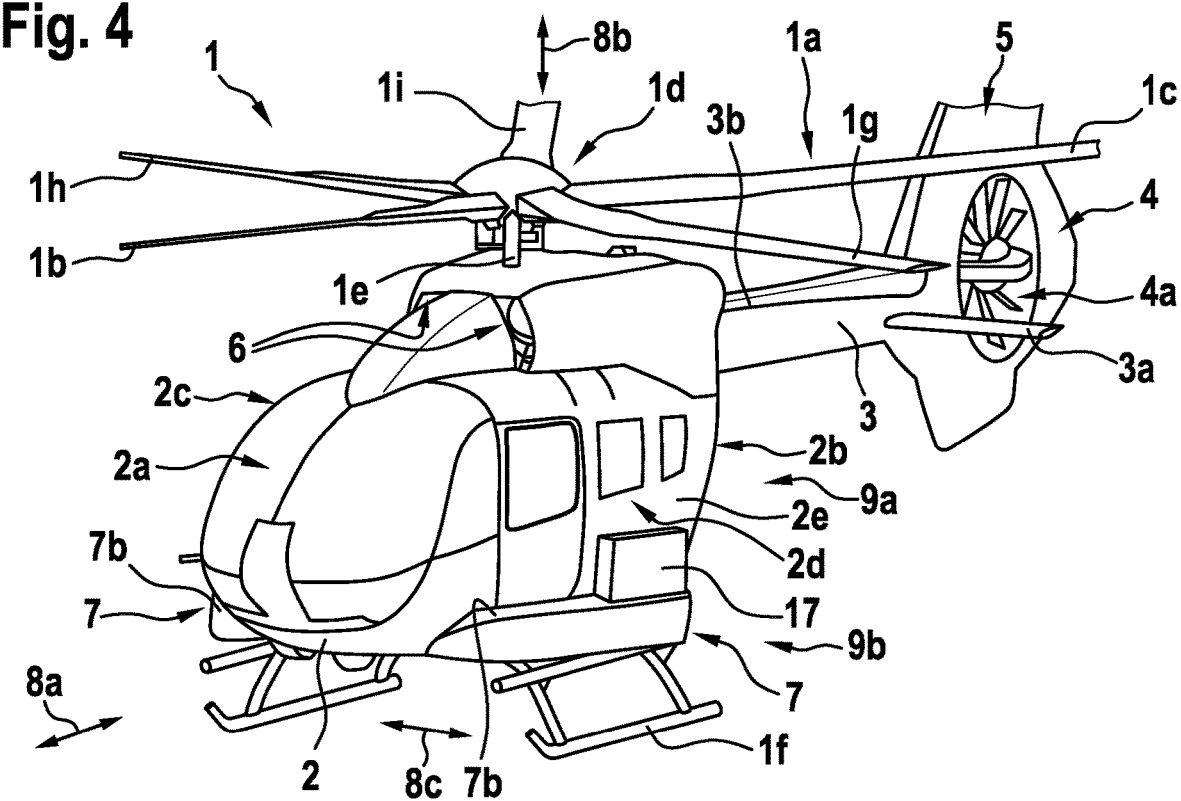
FIG. 4 shows a perspective view of the rotorcraft of FIG. 2 with the illustrative energy source storage units provided with a storage extension.

FIG. 4 shows the helicopter 1 of FIG. 2 and FIG. 3, which includes in the height direction 8b the upper region 9a and the subfloor region 9b. The helicopter 1 comprises the fuselage 2 that forms the cabin 2a and that is arranged within the outer shell 2e which forms the starboard side wall 2c and the portside wall 2d. The fuselage 2 is connected to the landing gear if and the tail boom 3 which is provided with the horizontal stabilizer 3a, the at least one counter-torque device 4, and the fin 5. On top of the fuselage 2 is located the at least one main rotor 1a which is driven by the one or more engines 6. The at least one main rotor 1a is embodied as a multi-blade main rotor with the rotor blades 1b, 1c, 1g, 1h, 1i, which are mounted at the rotor head 1d to the rotor shaft 1e and illustratively cut-off at their outer ends. The helicopter 1 further comprises the energy source storage units 7 with their energy source storage containers 7b.

However, in contrast to FIG. 2 and FIG. 3 at least the energy source storage unit 7 provided on the port side wall 2d comprises a storage extension 17. Illustratively, the storage extension 17 extends in the height direction 8b from the subfloor region 9b into the upper region 9a of the helicopter 1.

Figure 5:
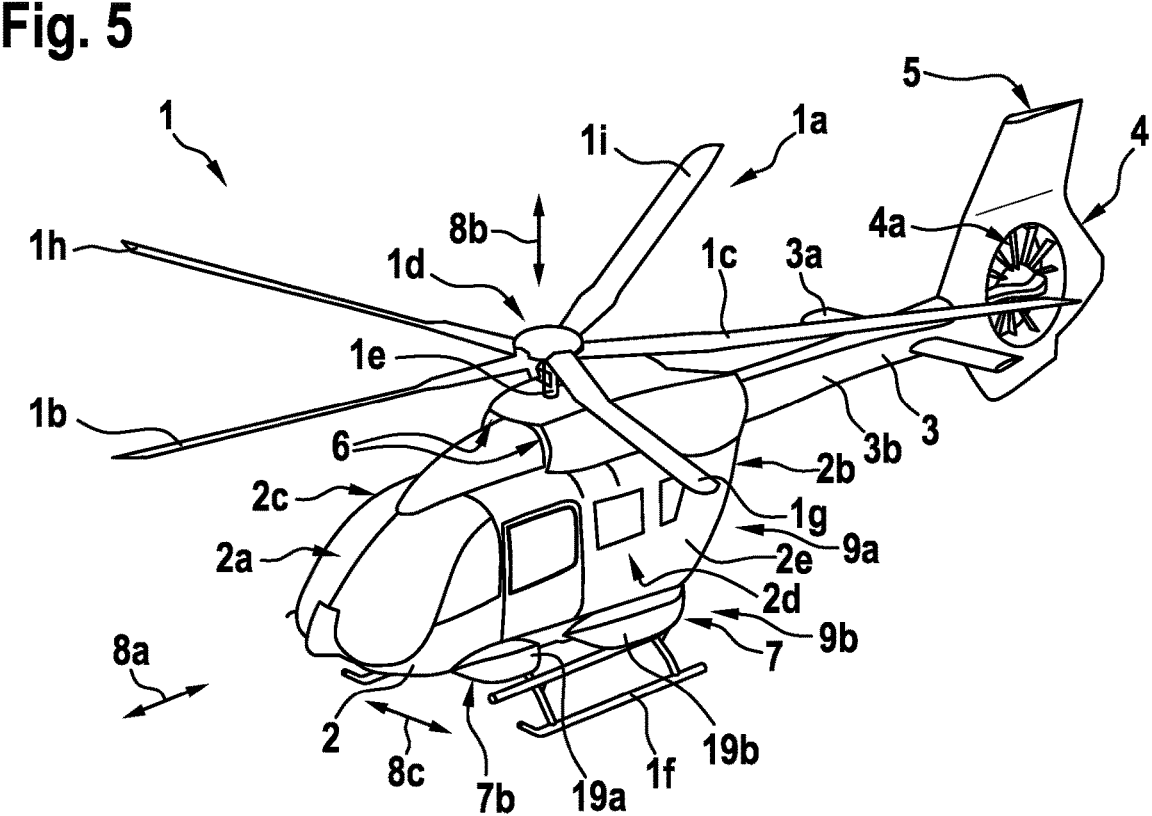
FIG. 5 shows a perspective view of the rotorcraft of FIG. 2 with the illustrative energy source storage units divided in sub-storage units.

FIG. 5 shows the helicopter 1 of FIG. 2 and FIG. 3, which includes in the height direction 8b the upper region 9a and the subfloor region 9b. The helicopter 1 comprises the fuselage 2 that forms the cabin 2a and that is arranged within the outer shell 2e which forms the starboard side wall 2c and the portside wall 2d. The fuselage 2 is connected to the landing gear if and the tail boom 3 which is provided with the horizontal stabilizer 3a, the at least one counter-torque device 4, and the fin 5. On top of the fuselage 2 is located the at least one main rotor 1a which is driven by the one or more engines 6. The at least one main rotor 1a is embodied as a multi-blade main rotor with the rotor blades 1b, 1c, 1g, 1h, 1i, which are mounted at the rotor head 1d to the rotor shaft 1e. The helicopter 1 further comprises the energy source storage units 7 with their energy source storage containers 7b. Nevertheless, in FIG. 5 only the energy source storage unit 7 provided on the port side wall 2d is visible.

In contrast to FIG. 2 and FIG. 3, the energy source storage unit 7 provided on the port side wall 2d comprises now illustratively two separate energy source storage containers 19a, 19b. However, it should be noted that the two separate energy source storage containers 19a, 19b are only shown for illustrating that various different shapes and volumes are realizable and, therefore, contemplated for implementation of the energy source storage units 7. More specifically, such various different shapes and volumes may be implemented e.g., based on requirements from a helicopter equipment point of view, such as door openings, hoist operations, accessibility of certain areas, etc., and/or due to a need of keeping the helicopter's center of gravity in position. In this latter case a bigger part of a respective energy storage mass (or volume respectively) realized by means of the energy source storage container 19b is arranged in an aft position, as illustrated.

Figure 6:
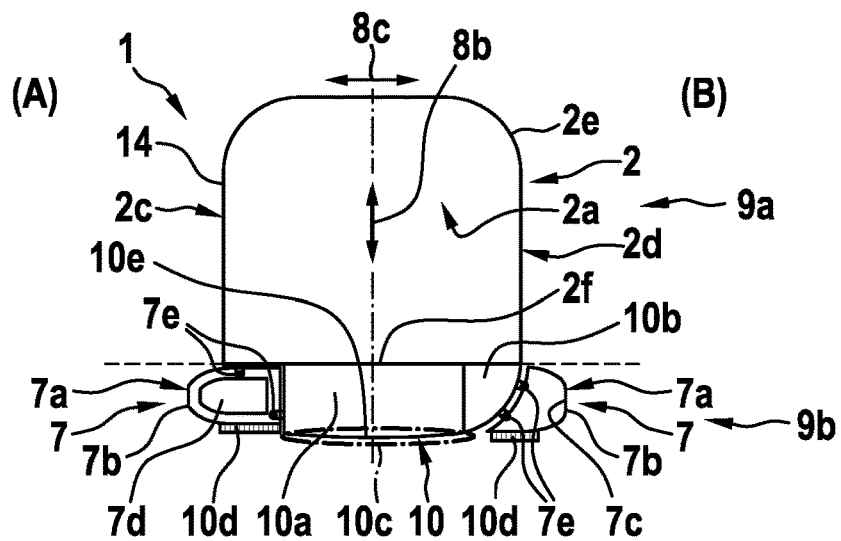
FIG. 6 shows a schematic view of the rotorcraft of FIG. 1 with two differently configured energy source storage units.

FIG. 6 shows the helicopter 1 of FIG. 2 and FIG. 3, which comprises the fuselage 2 that forms the cabin 2a and that is arranged within the outer shell 2e which forms the starboard side wall 2c and the portside wall 2d. The fuselage 2 is shown extending in the height direction 8b and the lateral direction 8c. The helicopter 1 includes in the height direction 8b the upper region 9a and the subfloor region 9b. Furthermore, the helicopter 1 comprises the energy source storage units 7 with their energy source storage containers 7b.

However, in contrast to FIG. 2 and FIG. 3 the helicopter 1 is only schematically illustrated and only components that are related to arrangement of the energy source storage units 7 are shown. Accordingly, other components such as e.g., the at least one main rotor 14 and the landing gear if are omitted, for simplicity and clarity of the drawing.

Illustratively, the cabin 2a formed by the fuselage 2 comprises a cabin floor 2f. The cabin floor 2f divides the helicopter 1 in the height direction 8b into the upper region 9a and the subfloor region 9b, which is the region located below the cabin floor 2f.

As described above at FIG. 2, the subfloor region 9b illustratively accommodates the energy source storage units 7 and, more particularly, the energy source storage containers 7b. Each energy source storage container 7b preferably accommodates at least one energy source 7a. By way of example, the energy source storage container 7b located on the starboard side wall 2c side of the fuselage 2 comprises at least one electrical energy storage device 7d, such as one or more batteries, as energy source 7a, and the energy source storage container 7b located on the portside wall 2d side of the fuselage 2 comprises at least one hydrogen storage device 7c, such as one or more hydrogen tanks or bottles, as the energy source 7a. It should be noted that the electrical energy storage device 7d and the hydrogen storage device 7c are only shown in FIG. 6, for simplicity, but likewise applicable to all other configurations shown in the other drawing figures.

Preferably, the fuselage 2 and the outer shell 2e form in vicinity of the energy source storage units 7 a crashable structure 10 configured to be crashable in an emergency landing at least for limiting effects of impact on the energy source storage units 7. More specifically, the fuselage 2 and the outer shell 2e may form a central box-like structure 10a in the subfloor region 9b. Preferably, the central box-like structure 10a forms the crashable structure 10.

Illustratively, in the subfloor region 9b the crashable structure 10 extends farer away from the cabin floor 2f in the height direction 8b than the energy source storage units 7, thereby forming a crash energy dissipating region 10c which is preferably plastically deformable. In case of a crash, the crashable structure 10 and, more particularly, the crash energy dissipating region 10c preferably contacts ground before the energy source storage units 7 may contact ground. Thus, the crash energy dissipating region 10c may deform and dissipate energy for protection of rotorcraft occupants. Furthermore, each one of the energy source storage units 7 may be provided with one or more suitable energy absorption means 10d, such as e.g., bumpers, which may likewise deform and dissipate energy during a crash.

According to part (A) of FIG. 6, the energy source storage unit 7 located on the starboard side wall 2c side of the fuselage 2 is arranged laterally at the central box-like structure 10a, preferably at least essentially in parallel to the length direction (8a in FIG. 2) of the fuselage 2. More specifically, in part (A) the central box-like structure 10a forms an outer shell 10e which forms with the outer shell 2e of the fuselage 2 an outer skin 14 and the energy source storage unit 7 located on the starboard side wall 2c side of the fuselage 2 is attached via suitable attachment means 7e to the outer skin 14, the outer shell 2e, and/or the fuselage 2.

According to part (B) of FIG. 6, the central box-like structure 10a is provided with a lateral extension 10b formed by the fuselage 2 and the outer shell 2e in the subfloor region 9b. Thus, the energy source storage unit 7 located on the portside wall 2d side of the fuselage 2 is arranged laterally at the lateral extension 10b, preferably at least essentially in parallel to the length direction (8a in FIG. 2) of the fuselage 2. More specifically, in part (B) the outer skin 14 formed by the outer shell 10e of the central box-like structure 10a and the lateral extension 10b, and the outer shell 2e of the fuselage 2 is illustratively aerodynamically shaped and the energy source storage unit 7 located on the portside wall 2d side of the fuselage 2 is arranged outside the aerodynamically shaped outer skin 14 and attached via the suitable attachment means 7e to the aerodynamically shaped outer skin 14, the outer shell 2e, and/or the fuselage 2.

Figure 7:
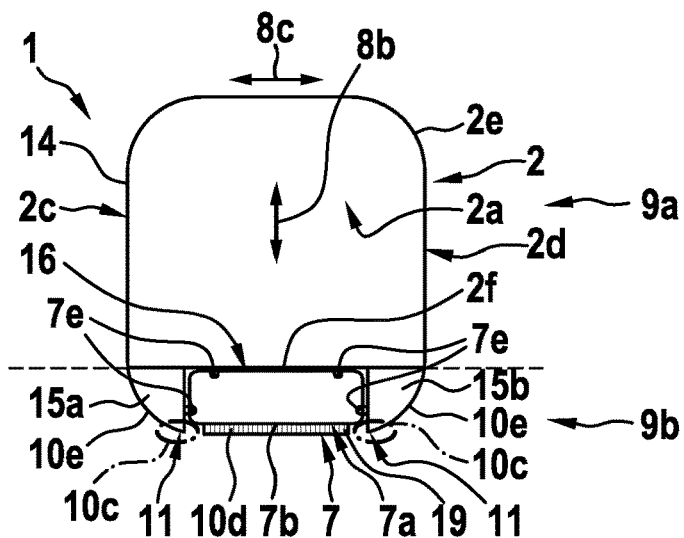
FIG. 7 shows a schematic view of the rotorcraft of FIG. 6 with another differently configured energy source storage unit.

FIG. 7 shows the helicopter 1 according to FIG. 6. Thus, the helicopter 1 comprises the fuselage 2 extending in the height direction 8b and the lateral direction 8c, which forms the cabin 2a and which is arranged within the outer shell 2e that forms the starboard side wall 2c and the portside wall 2d. The cabin floor 2f divides the helicopter 1 in the height direction 8b into the upper region 9a and the subfloor region 9b. However, in contrast to FIG. 6 the helicopter 1 now only comprises a single energy source storage unit 7 having the energy source storage container 7b accommodated in the subfloor region 9b.

More specifically, the fuselage 2 and the outer shell 2e now illustratively form lateral box-like structures 15a, 15b in the subfloor region 9b. The lateral box-like structures 15a, 15b form the outer shell 10e which forms with the outer shell 2e of the fuselage 2 the outer skin 14. Furthermore, the lateral box-like structures 15a, 15b illustratively delimit a central cavity 16 in the subfloor region 9b and the energy source storage unit 7 is arranged in this central cavity 16 and attached via the suitable attachment means 7e to the outer skin 14, the outer shell 2e, and/or the fuselage 2. In other words, the energy source storage unit 7 is arranged between the lateral box-like structures 15a, 15b in the subfloor region 9b, at least essentially in parallel to the length direction (8a in FIG. 2) of the fuselage 2.

In this configuration, the lateral box-like structures 15a, 15b preferably form in vicinity of the energy source storage unit 7 a crashable structure 11 configured to be crashable in an emergency landing at least for limiting effects of impact on the energy source storage unit 7. Illustratively, the crashable structure 11 extends in the subfloor region 9b farer away from the cabin floor 2f in the height direction 8b than the energy source storage unit 7, thereby forming a crash energy dissipating region, which is labelled with the reference sign 10c in analogy to FIG. 6, and which is preferably plastically deformable. In case of a crash, the crashable structure 11 and, more particularly, the crash energy dissipating region 10c preferably contacts ground before the energy source storage unit 7 may contact ground. Thus, the crash energy dissipating region 10c may deform and dissipate energy for protection of rotorcraft occupants. Furthermore, in analogy to FIG. 6 the energy source storage unit 7 may be provided with one or more suitable energy absorption means 10d, such as e.g., one or more bumpers 19, which may likewise deform and dissipate energy during a crash.

Figure 8:
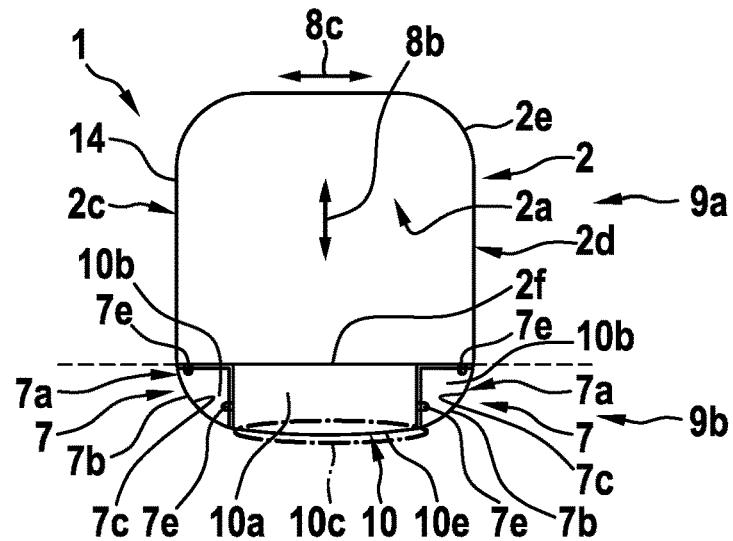
FIG. 8 shows a schematic view of the rotorcraft of FIG. 6 with still other differently configured energy source storage units.

FIG. 8 shows the helicopter 1 according to FIG. 6. Thus, the helicopter 1 comprises the fuselage 2 extending in the height direction 8b and the lateral direction 8c, which forms the cabin 2a and which is arranged within the outer shell 2e that forms the starboard side wall 2c and the portside wall 2d. The cabin floor 2f divides the helicopter 1 in the height direction 8b into the upper region 9a and the subfloor region 9b. The fuselage 2 and the outer shell 2e form the crashable structure 10 that is provided according to part (B) of FIG. 6 with the lateral extensions 10b formed by the fuselage 2 and the outer shell 2e in the subfloor region 9b. However, in contrast to part (B) of FIG. 6 the lateral extensions 10b now form the energy source storage units 7 having the energy source storage containers 7b accommodated in the subfloor region 9b.

Figure 9:
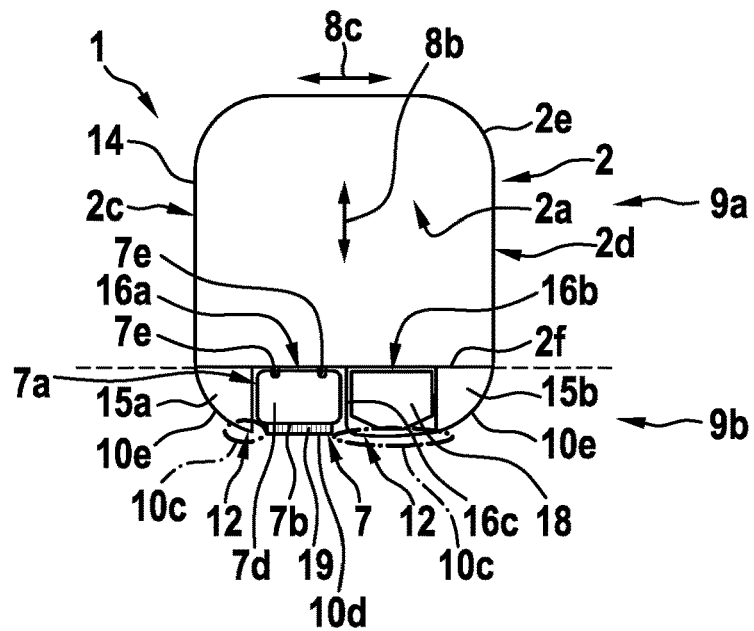
FIG. 9 shows a schematic view of the rotorcraft of FIG. 6 with still another differently configured energy source storage unit and a conventional fuel tank.

FIG. 9 shows the helicopter 1 according to FIG. 7. Thus, the helicopter 1 comprises the fuselage 2 extending in the height direction 8b and the lateral direction 8c, which forms the cabin 2a and which is arranged within the outer shell 2e that forms the starboard side wall 2c and the portside wall 2d. The cabin floor 2f divides the helicopter 1 in the height direction 8b into the upper region 9a and the subfloor region 9b. The fuselage 2 and the outer shell 2e illustratively form the lateral box-like structures 15a, 15b in the subfloor region 9b. The lateral box-like structures 15a, 15b form the outer shell 10e which forms with the outer shell 2e of the fuselage 2 the outer skin 14. Furthermore, the helicopter 1 comprises the single energy source storage unit 7 having the energy source storage container 7b accommodated in the subfloor region 9b.

However, in contrast to FIG. 7 the lateral box-like structures 15a, 15b illustratively delimit two separate cavities 16a, 16b in the subfloor region 9b, which are separated from each other by a central separation wall 16c. By way of example, the single energy source storage unit 7 is arranged in the cavity 16a and attached via the suitable attachment means 7e to the outer skin 14, the outer shell 2e, and/or the fuselage 2, and the cavity 16b accommodates a conventional fuel tank 18 and is illustratively covered by the outer shell 10e. In other words, the energy source storage unit 7 is illustratively arranged between the lateral box-like structure 15a and the central separation wall 16c in the subfloor region 9b, at least essentially in parallel to the length direction (8a in FIG. 2) of the fuselage 2, and the fuel tank 18 is arranged between the lateral box-like structure 15b and the central separation wall 16c in the subfloor region 9b, at least essentially in parallel to the length direction (8a in FIG. 2) of the fuselage 2.

In this configuration, the lateral box-like structures 15a, 15b and the outer shell preferably form in vicinity of the energy source storage unit 7 and the fuel tank 18 a crashable structure 12 configured to be crashable in an emergency landing at least for limiting effects of impact on the energy source storage unit 7. In fact, even the fuel tank 18 as such preferably forms at least part of the crashable structure 12.

Illustratively, the crashable structure 12 extends in the subfloor region 9b farer away from the cabin floor 2f in the height direction 8b than the energy source storage unit 7, thereby forming a crash energy dissipating region, which is labelled with the reference sign 10c in analogy to FIG. 7, and which is preferably plastically deformable. In case of a crash, the crashable structure 12 and, more particularly, the crash energy dissipating region 10c preferably contacts ground before the energy source storage unit 7 may contact ground. Thus, the crash energy dissipating region 10c may deform and dissipate energy for protection of rotorcraft occupants. Furthermore, in analogy to FIG. 7 the energy source storage unit 7 may be provided with the one or more suitable energy absorption means 10d, such as e.g., the one or more bumpers 19, which may likewise deform and dissipate energy during a crash.

Figure 10:
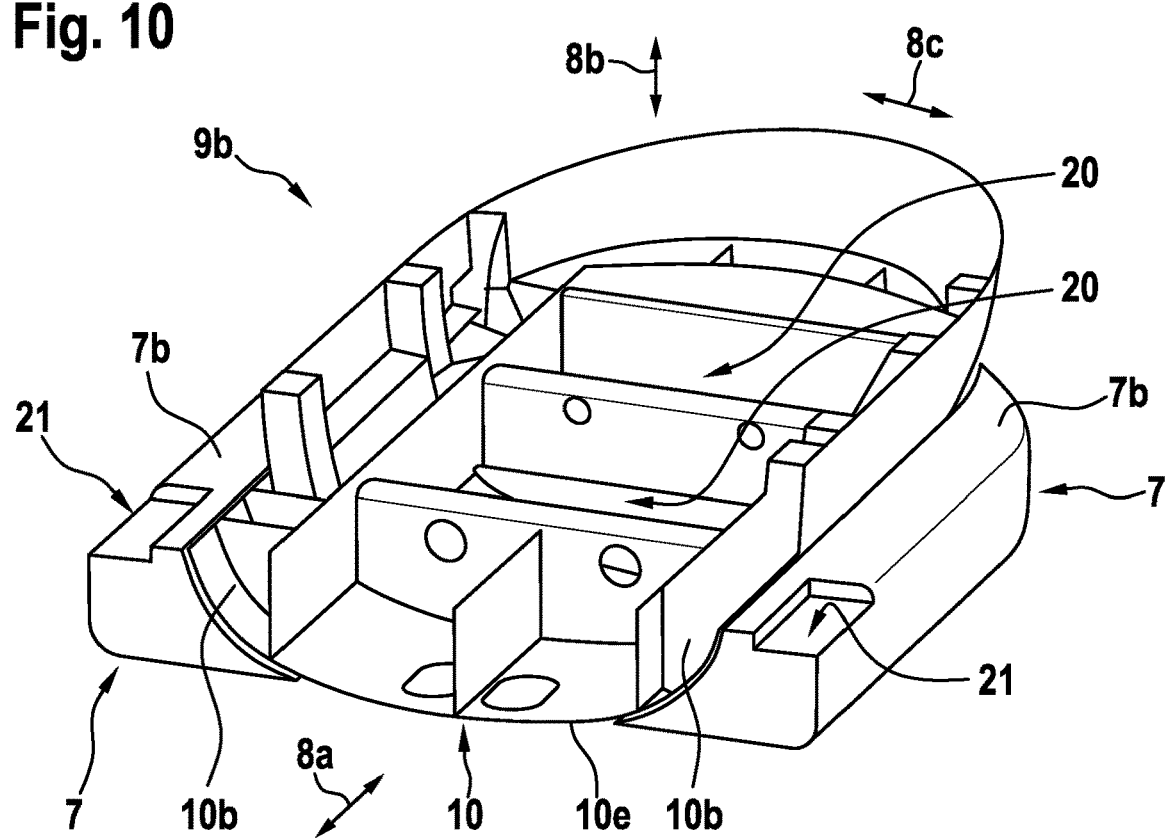
FIG. 10 shows a perspective view of an illustrative subfloor region of the rotorcraft of FIG. 2 and FIG. 3.

FIG. 10 shows the subfloor region 9b of FIG. 2 and FIG. 3 with the crashable structure 10 according to part (B) of FIG. 6, which is provided with the lateral extensions 10b According to part (B) of FIG. 6 the energy source storage units 7 are arranged laterally at the lateral extensions 10b, preferably at least essentially in parallel to the length direction 8a.

However, in contrast to part (B) of FIG. 6, the crashable structure 10 is now provided with additional storage compartments 2 which are e.g., usable for storage of equipment and so on. Furthermore, illustratively each one of the at least one energy source storage unit 7 forms an accessible step 21 usable e.g., by passengers of the helicopter 1 of FIG. 2 to FIG. 5.

It should be noted that modifications to the above described embodiments are within the common knowledge of the person skilled in the art and, thus, also considered as being part of the present disclosure. For instance, in FIG. 6 part (A) and (B) two different possible configurations are shown. However, both sides of the helicopter 1 of FIG. 6 may likewise either be embodied according to the configuration in part (A), or according to the configuration in part (B), and so on.

REFERENCE LIST

1 rotorcraft
1a multi-blade main rotor
1b, 1c, 1g, 1h, 1i rotor blades
1d rotor head
1e rotor shaft
1f landing gear
2 fuselage
2a cabin
2b rear fuselage
2c starboard side wall
2d portside wall
2e fuselage outer shell
2f cabin floor
3 tail boom
3a horizontal stabilizer
3b tail boom cone
4 counter-torque device
4a tail rotor
5 fin
6 engines
7 energy source storage unit
7a energy source
7b energy source storage container
7c hydrogen storage device
7d electrical energy storage device
7e attachment means
8a length direction (roll axis)
8b height direction (yaw axis)
8c lateral direction (pitch axis)
9a upper region
9b subfloor region
10, 11, 12 crashable structures
10a central box-like structure
10b lateral extensions
10c crash energy dissipating regions
10d energy absorption means
10e subfloor outer shell
13 air inlets
14 outer skin
15a, 15b lateral box-like structures
16 central cavity
16a, 16b separate cavities
16c central separation wall
17 storage extension
18 fuel tank
19 bumper
19a, 19b separate containers
20 additional storage compartments
21 accessible step

What is claimed is:

1. A rotorcraft comprising:
a fuselage arranged within a fuselage outer shell;
at least one main rotor located on top of the fuselage;
at least one engine provided for driving the at least one main rotor; and
at least one energy source storage unit comprising at least one energy source configured to provide energy for powering the at least one engine for driving the at least one main rotor;
wherein the at least one energy source storage unit is arranged outside the fuselage outer shell in a subfloor region of the rotorcraft; and
wherein the fuselage and the fuselage outer shell form a central box-like structure in the subfloor region; wherein the at least one energy source storage unit is arranged laterally at the central box-like structure, at least essentially in parallel to a length direction of the fuselage, and wherein the central box-like structure forms a crashable structure that contacts ground in an emergency landing before the at least one energy source storage unit may contact ground in order to deform and dissipate energy.

2. The rotorcraft of claim 1,
wherein the at least one energy source storage unit comprises at least one energy source storage container for accommodating the at least one energy source; and
wherein the at least one energy source comprises at least one of a hydrogen storage device or an electrical energy storage device.

3. The rotorcraft of claim 2,
wherein the at least one energy source storage container is removably attached to the fuselage and/or the fuselage outer shell.

4. The rotorcraft of claim 2,
wherein the central box-like structure is provided with lateral extensions in the subfloor region; and
wherein the at least one energy source storage unit is arranged laterally at the lateral extensions, at least essentially in parallel to the length direction of the fuselage.

5. The rotorcraft of claim 4,
wherein the central box-like structure and the lateral extensions form a subfloor outer shell forming with the fuselage outer shell an aerodynamically shaped outer skin; and
wherein the at least one energy source storage unit is arranged outside the aerodynamically shaped outer skin.

6. The rotorcraft of claim 2,
wherein the at least one energy source storage unit forms an accessible step.

7. The rotorcraft of claim 2,
wherein the at least one energy source storage unit comprises a storage extension extending from the subfloor region into an upper region of the rotorcraft.

8. The rotorcraft of claim 1,
wherein the central box-like structure is provided with lateral extensions in the subfloor region; and
wherein the at least one energy source storage unit is arranged laterally at the lateral extensions, at least essentially in parallel to the length direction of the fuselage.

9. The rotorcraft of claim 8,
wherein the central box-like structure and the lateral extensions form a subfloor outer shell forming with the fuselage outer shell an aerodynamically shaped outer skin; and
wherein the at least one energy source storage unit is arranged outside the aerodynamically shaped outer skin.

10. The rotorcraft of claim 8,
wherein the at least one energy source storage unit forms an accessible step.

11. The rotorcraft of claim 8,
wherein the at least one energy source storage unit comprises a storage extension extending from the subfloor region into an upper region of the rotorcraft.

12. The rotorcraft of claim 8,
wherein the at least one energy source storage unit is provided with at least one energy absorption means, and wherein the at least one energy absorption means comprises at least one bumper.

13. The rotorcraft of claim 8,
wherein the at least one energy source storage unit comprises at least one air inlet configured to enable air cooling of the at least one energy source.

14. The rotorcraft of claim 1,
wherein the at least one energy source storage unit forms an accessible step.

15. The rotorcraft of claim 14,
wherein the at least one energy source storage unit comprises a storage extension extending from the subfloor region into an upper region of the rotorcraft.

16. The rotorcraft of claim 14,
wherein the at least one energy source storage unit is provided with at least one energy absorption means, and wherein the at least one energy absorption means comprises at least one bumper.

17. The rotorcraft of claim 14,
wherein the at least one energy source storage unit comprises at least one air inlet configured to enable air cooling of the at least one energy source.

18. The rotorcraft of claim 1,
wherein the at least one energy source storage unit comprises a storage extension extending from the subfloor region into an upper region of the rotorcraft.

19. The rotorcraft of claim 1,
wherein the at least one energy source storage unit is provided with at least one energy absorption means, and wherein the at least one energy absorption means comprises at least one bumper.

20. The rotorcraft of claim 1,
wherein the at least one energy source storage unit comprises at least one air inlet configured to enable air cooling of the at least one energy source.

* * * * *